United States Patent
Smits (10) Patent No.: US 10,884,127 B2
(45) Date of Patent: Jan. 5, 2021

(54) SYSTEM AND METHOD FOR STEREO TRIANGULATION

(71) Applicant: Samsung Electronics Co., Ltd., Suwon-si (KR)

(72) Inventor: Gerard Dirk Smits, Los Gatos, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 257 days.

(21) Appl. No.: 15/658,952

(22) Filed: Jul. 25, 2017

(65) Prior Publication Data

US 2018/0038961 A1 Feb. 8, 2018

Related U.S. Application Data

(60) Provisional application No. 62/369,879, filed on Aug. 2, 2016.

(51) Int. Cl.
*G01S 17/48* (2006.01)
*G01S 17/04* (2020.01)
*G01S 17/931* (2020.01)
*G01S 7/481* (2006.01)

(52) U.S. Cl.
CPC ............ *G01S 17/48* (2013.01); *G01S 7/4817* (2013.01); *G01S 17/04* (2020.01); *G01S 17/931* (2020.01)

(58) Field of Classification Search
None
See application file for complete search history.

(56) References Cited

U.S. PATENT DOCUMENTS

| | | | | |
|---|---|---|---|---|
| 6,343,810 B1* | 2/2002 | Breed | ................ | B60R 21/0134 280/730.2 |
| 2005/0046584 A1* | 3/2005 | Breed | ..................... | B60C 11/24 340/13.31 |
| 2006/0072914 A1* | 4/2006 | Arai | ........................ | G01S 17/86 396/106 |
| 2006/0208169 A1* | 9/2006 | Breed | .................... | B60N 2/002 250/221 |
| 2006/0210145 A1* | 9/2006 | Lee | ..................... | G01B 11/2513 382/154 |
| 2007/0279590 A1* | 12/2007 | Ebisawa | ................ | A61B 3/113 351/208 |
| 2008/0205748 A1* | 8/2008 | Lee | ......................... | G01B 11/25 382/154 |
| 2009/0279807 A1* | 11/2009 | Kanamorl | ............ | G02B 5/3025 382/274 |
| 2011/0001957 A1* | 1/2011 | Braune | .................. | G01B 11/00 356/4.01 |
| 2011/0018973 A1* | 1/2011 | Takayama | ................ | G01C 3/06 348/47 |
| 2012/0236124 A1* | 9/2012 | Aoki | ....................... | G01S 11/12 348/47 |

(Continued)

OTHER PUBLICATIONS

Rolling shutter—Wikipedia (Year: 2016).*

*Primary Examiner* — Isam A Alsomiri
*Assistant Examiner* — Amir J Askarian
(74) *Attorney, Agent, or Firm* — F. Chau & Associates, LLC (57) ABSTRACT

Provided is a disclosure for detection of objects using projected light of one or more frequencies, where the light may be structured or non-structured.

23 Claims, 7 Drawing Sheets

(56) References Cited

U.S. PATENT DOCUMENTS

| | | | | |
|---|---|---|---|---|
| 2012/0262550 A1* | 10/2012 | Bridges | ............... | G01C 15/002 |
| | | | | 348/46 |
| 2013/0087719 A1* | 4/2013 | Yang | ..................... | G01N 21/64 |
| | | | | 250/459.1 |
| 2015/0312552 A1* | 10/2015 | Lu | ....................... | H04N 17/002 |
| | | | | 348/51 |
| 2016/0029009 A1* | 1/2016 | Lu | ...................... | G01B 11/2545 |
| | | | | 348/47 |
| 2016/0227193 A1* | 8/2016 | Osterwood | ............. | G01S 17/42 |
| 2016/0309143 A1* | 10/2016 | Fu | ........................ | H04N 5/2256 |
| 2016/0370171 A1* | 12/2016 | Bridges | ................. | G01B 5/004 |
| 2017/0131718 A1* | 5/2017 | Matsumura | .............. | G05D 1/02 |

\* cited by examiner

SYSTEM AND METHOD FOR STEREO TRIANGULATION

RELATED APPLICATION(S)

This application claims the benefit of priority to the U.S. Provisional Application 62/369,879, filed on Aug. 2, 2016, the disclosure of which is incorporated herein in their entirety by reference.

BACKGROUND

The present disclosure relates to distance measuring, and more particularly, to stereo triangulation. Various efforts are being made for stereo vision systems for measuring distances and 3-D imaging, however, these efforts are time-consuming and may require expensive devices.

Various limitations and disadvantages of conventional and traditional approaches will become apparent to one of skill in the art, through comparison of such systems with some aspects of the present disclosure as set forth in the remainder of this application with reference to the drawings.

SUMMARY

A system and/or method for stereo triangulation, substantially as shown in and/or described in connection with at least one of the drawings.

Various advantages, aspects, and novel features of the present disclosure, as well as details of an illustrated embodiment thereof, will be more fully understood from the following description and drawings.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

The present embodiments should not be construed as being limited to the descriptions set forth herein. Rather, these embodiments are provided as examples so that this disclosure will be thorough and complete and will fully convey the concept of the present embodiments to one of ordinary skill in the art. The appended claims illustrate some of the embodiments of the present disclosure.

Like reference numerals refer to like elements throughout the specification. All terms including descriptive or technical terms used herein should be construed as having meanings that are obvious to one of ordinary skill in the art. When a term has an ambiguous meaning due to evolving of language, precedent cases, or the appearance of new technologies, the meaning of a term used in this disclosure should first be clarified by its usage and/or definition in this disclosure. The term should then be clarified as one of ordinary skill in the art would have understood the term at the time of this disclosure.

When a part "includes" or "comprises" an element, unless there is a particular description contrary thereto, the part can further include other elements. The term "unit" in the embodiments of the present disclosure means a software component or a hardware component that performs a specific function. The hardware component may include, for example, a field-programmable gate array (FPGA) or an application-specific integrated circuit (ASIC).

Software, or software component, may refer to executable code and/or data used by the executable code in an addressable storage medium. Thus, software may be, for example, object-oriented software components, class components, and task components, and may include processes, functions, attributes, procedures, subroutines, segments of program code, drivers, firmware, application programs, micro codes/circuits, data, a database, data structures, tables, arrays, or variables.

A function provided by a "unit" may be divided into additional components and "units."

Reference will now be made in detail to embodiments, examples of which are illustrated in the accompanying drawings. In this regard, the present embodiments may have different forms and should not be construed as being limited to the descriptions set forth herein.

In the following description, well-known functions or constructions are not described in detail so as not to obscure the embodiments with unnecessary detail.

Figure 1A:
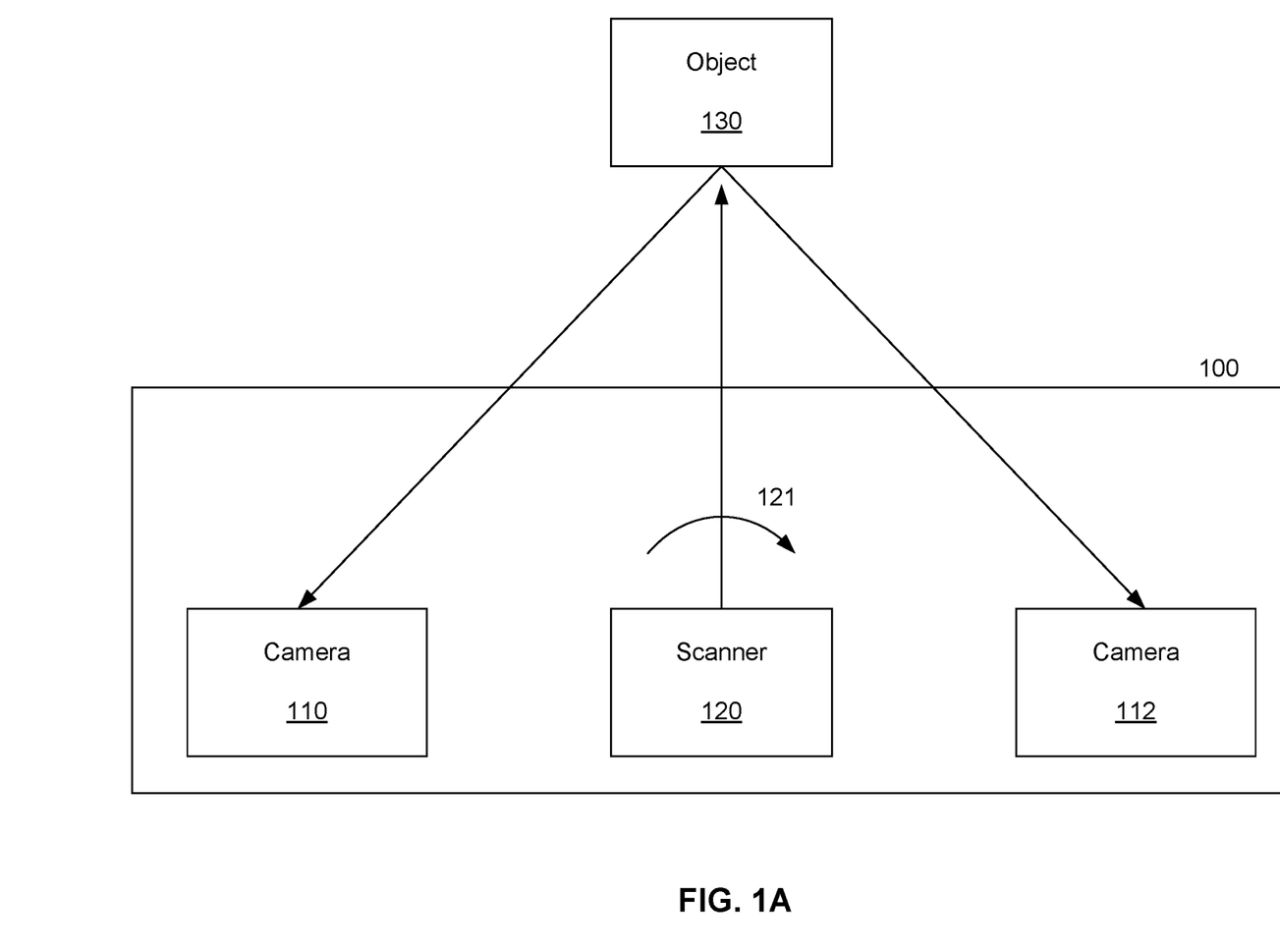
FIG. 1A is an illustration of stereo triangulation, in accordance with an embodiment of the disclosure.

FIG. 1A is an illustration of stereo triangulation, in accordance with an embodiment of the disclosure. Referring to FIG. 1A, there is shown a platform 100 with cameras 110 and 112, a scanner 120 that provides source light for exposing an object, and an object 130 that is being recorded. The cameras 110 and 112 may be any type of suitable cameras, including, for example, CMOS cameras. The scanner 120 may be any type of suitable light source that can illuminate an area in a raster method such as, for example, a light scanner with a scanning MEMS technology that outputs laser illumination in a series of horizontal lines. Accordingly, in an embodiment, the scanner 120 may output 1080 horizontal lines per frame. In various embodiments of the disclosure, the scanner 120 may provide substantially collimated light that may minimize dispersion of the emitted light. Various embodiments of the disclosure may have the scanner 120 be a point source for the emitted light.

Various embodiments may offer different horizontal and/or vertical resolution for specific purposes. For example, some embodiments may have 1080 lines of pixels, with 1920 pixels per line. To make various descriptions easier in this disclosure, an assumption will be made of 1080 lines per frame and 1920 pixels per line, with the full understanding that this does not limit the scope of the disclosure to any specific number of lines per frame or pixels per line.

Additionally, since the distance between the cameras 110 and 112 and the scanner 120 is known, the corresponding pixels from each camera can be matched to provide distance information from each camera, and, hence, 3-D imagery is possible. Additionally, there may be 3 separate triangulations possible for the configuration with the scanner 120 and the cameras 110 and 112. The first triangle consists of the camera 110, the scanner 120, and the object 130 as vertices. The second triangle consists of the camera 112, the scanner 120, and the object 130 as vertices. The third triangle comprises the camera 110, the camera 112, and the object 130 as vertices. Information received from one or more of the triangles may be processed to optimize various types of image generation.

For imaging in general, including for 3-D imaging, a structured light sequence such as, for example, de Bruijn sequence may be used to optimize image capture. However, various embodiments of the disclosure are not limited to using structured light sequences. Furthermore, various embodiments of the disclosure may allow the scanner 120 to vary its output intensity. This may be to allow, for example, the cameras 110 and 112 to capture images from farther away.

Various embodiments may also control the horizontal travel 121 of the scanner 120. For example, to get more detail for a scan, the scanner 120 may be controlled for a shorter horizontal travel 121 than for a normal scan in the same amount of time. This may allow for more illumination of a smaller image area to get more detail. In other cases, the scanner 120 may be controlled for a longer horizontal travel 121 than for a normal scan in the same amount of time. This may allow for coverage of a larger image area with possibly less detail. The scanner 120 may also be controlled for the number of horizontal lines scanned.

Additionally, the scanner 120 may also be controlled for the horizontal position scanned as well as vertical position scanned. For example, the horizontal position scanned may indicate a horizontal start position and a horizontal end position to get more detail for a specific area of an object or environment. Similarly, for the vertical position scanned, there may be indications of the start line and the end line. In this way, the area scanned can be narrowed, and, hence, provide a zoom effect. Further control of the scanner 120 may also comprise the intensity of the beam output, whether to scan the reduced area in the normal amount of time or at the normal scan speed but effectively have more "frames" per second since the frames are smaller.

In this manner, various embodiments of the disclosure may allow specifying a start of a horizontal sweep, and a horizontal sweep range. Similarly, the start of the vertical sweep may also be specified, as well as the vertical sweep range.

The cameras 110 and 112 may also be controlled to read out specific horizontal lines by exposing some lines (rows) of pixels to synchronize with the scanner 120, which may scan different number of lines than the number of rows of pixels in the cameras 110 or 112. Some embodiments may also allow the cameras 110 or 112 to specify start pixel and end pixel to be read from a row to further synchronize with the scanner 120. This may allow reading out and processing pixels from the desired portion of the frame.

Furthermore, some embodiments may allow the cameras to be controlled to swivel some amount. This may allow, for example, each individual camera 110 and 112 to capture images of different areas. Accordingly, the cameras 110 and 112 may be controlled to provide an image of the object 130, which may be a 3-D image, or each camera 110 and 112 may provide images of overlapping or non-overlapping areas. Therefore, the cameras 110 and 112 may be configured to provide individual images of the left side of the area in front for the camera 110 and the right side of the area in from of the camera 112. Furthermore, in case one of the cameras 110 and 112 is disabled, or processing circuitry/software for one of the cameras 110 and 112 is disabled, the other of the cameras 110 and 112 may be used to provide mono images of the area in front that is being illuminated by the scanner 120. In some cases, the remaining camera 110 or 112 may swivel horizontally and/or vertically to give a wider field of view.

Various embodiments of the disclosure may also allow the scanner 120 to be controlled to swivel. For example, this may be to provide a better light pattern for the camera 110 and/or 112 that may be swiveled. The swiveling of the scanner 120 may use any suitable technique that controls the scanner 120 and/or individual parts of the scanner 120. The direction of travel of the emitted light may also be controlled within the scanner 120 or external to the scanner 120. The direction of travel may be controlled using, for example, optical lens(es).

While FIG. 1A shows the scanner to be in the middle between the cameras 110 and 112, the disclosure need not be so limited. For example, the scanner 120 can be skewed toward one of the cameras 110 or 112, or the scanner 120 may be located to the right of both cameras 110 and 112, or to the left of both cameras 110 and 112.

Additionally, the cameras 110 and 112 and the scanner 120 may use different parts of the light spectrum, such as visible light, infrared light, etc. While the cameras 110 and 112 may be the same type, various embodiments of the disclosure need not be so limited. For example, the camera 110 may be sensitive to RGB spectrum while the camera 112 may be sensitive to infrared spectrum. Other types of cameras that may be used may be sensitive to, for example, visible light, and infrared light. Accordingly, the disclosure does not limit a camera used in an embodiment to any specific electro-magnetic field spectrum. Each camera 110 and 112 may also have optical zoom capability in addition to software zoom capability and the effective zoom capability from specifying the horizontal/vertical scan ranges of the scanner 120 and the similar receive pixel ranges for the cameras 110 and 112.

Furthermore, while the scanner 120 was described as providing raster output lines that are horizontal and parallel to each other, various embodiments of the disclosure may allow control of the scanner 120 to allow different patterns of light. Accordingly, the light may be output in a pattern that does not comprise parallel, horizontal lines. Various patterns may be used such as, for example, diagonal lines that are parallel, various lines output at different angles, etc. Parallel lines may also be output with the line starting from the right side, or where the parallel lines are vertical. Accordingly, the scanner 120 may be able to be controlled to output lines of light where the lines do not necessarily start on the left side, or are not parallel, horizontal lines.

Various embodiments of the disclosure may provide for the scanner 120 and the cameras 110 and 112 to be on an epipolar plane.

Figure 1B:
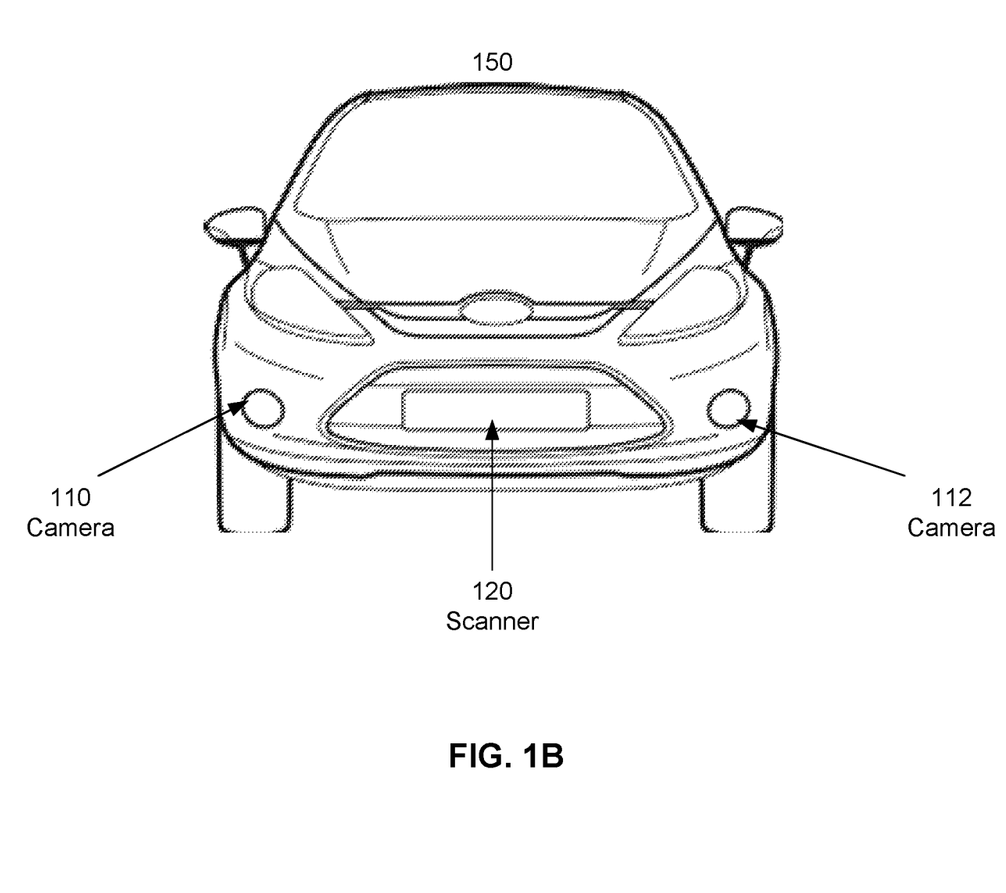
FIG. 1B is an illustration of stereo triangulation on an automotive platform, in accordance with an embodiment of the disclosure.

FIG. 1B is an illustration of stereo triangulation on an automotive platform, in accordance with an embodiment of the disclosure. Referring to FIG. 1B, there is shown an automotive platform 150 that may be the platform 100 of FIG. 1. Accordingly, the automotive platform 100 has cameras 110 and 112 and a scanner 120. As described above, the automotive platform 150 can still view the environment in front even if one of the cameras 110 and 112 is disabled.

Additionally, as also described above, the cameras 110 and 112 may be able to make up for a certain extent the functionality of another sensor that may have failed by viewing more of the front right area and the front left area with the cameras 110 and 112, respectively, by generally giving up the 3-D imaging to the front. This may entail adjusting the scan area by the scanner 120 as well as possibly adjusting an angle of the cameras 110 and/or 112. Some embodiments may be configured to provide limited 3-D imaging near the center front of the automotive platform 150 even in this situation.

Various embodiments may also have a scanner 120 in a headlight, and the scanned light can be output by the headlight such that the total light emitted by the headlight does not exceed any local regulation that may govern a headlight. For example, US regulations will be followed for those devices that are meant for use in the US, EU regulations will be followed for those devices that are meant for use in the EU, Chinese regulations will be followed for those devices that are meant for use in China, etc. Whether the scanner 120 is in a headlight or some other part of a vehicle, the total light emitted for a particular band (visible, IR, etc.) can be controlled to meet the various regulations governing those bands.

Accordingly, the cameras 110 and 112 may be more sensitive to the wavelength of the scanned light output by the scanner 120 in the headlight than to the wavelength of the light meant to illuminate the road ahead. The light from the scanner 120 in the headlight may also be structured (patterned) as described earlier or not structured. Additionally, there may be a scanner 120 in both headlights, or in more lights, and each scanner 120 may provide non-structured light or provide structured light. Therefore, a camera may have the capability to make use of structured light from one camera or structured lights from multiple cameras.

A scanner 120 may also be tuned to project structured light that may allow better discrimination for horizontal detail, and another scanner 120 may be tuned to project structured light that may allow better discrimination for vertical detail. The scanners 120 may also be controlled to turn on/off the structuring of the emitted light, as well as to provide structured light for horizontal discrimination or vertical discrimination. One embodiment may comprise one scanner 120 providing structured light for vertical discrimination and another scanner 120 providing structured light for horizontal discrimination. One or more cameras may then be synchronized with the one or more scanners to receive light, whether structured or not.

While the scanner in the headlight was described with respect to an automotive platform, various embodiments of the disclosure may use the scanner in a headlight embodiment in any vehicle (land, air, water, space, etc.), and also with other types of light such as a flashlight synchronized with a receiving camera(s) on a person. As can be seen by those of ordinary skill in the art, an embodiment of the disclosure can be used with any number of different scenarios.

Figure 2:
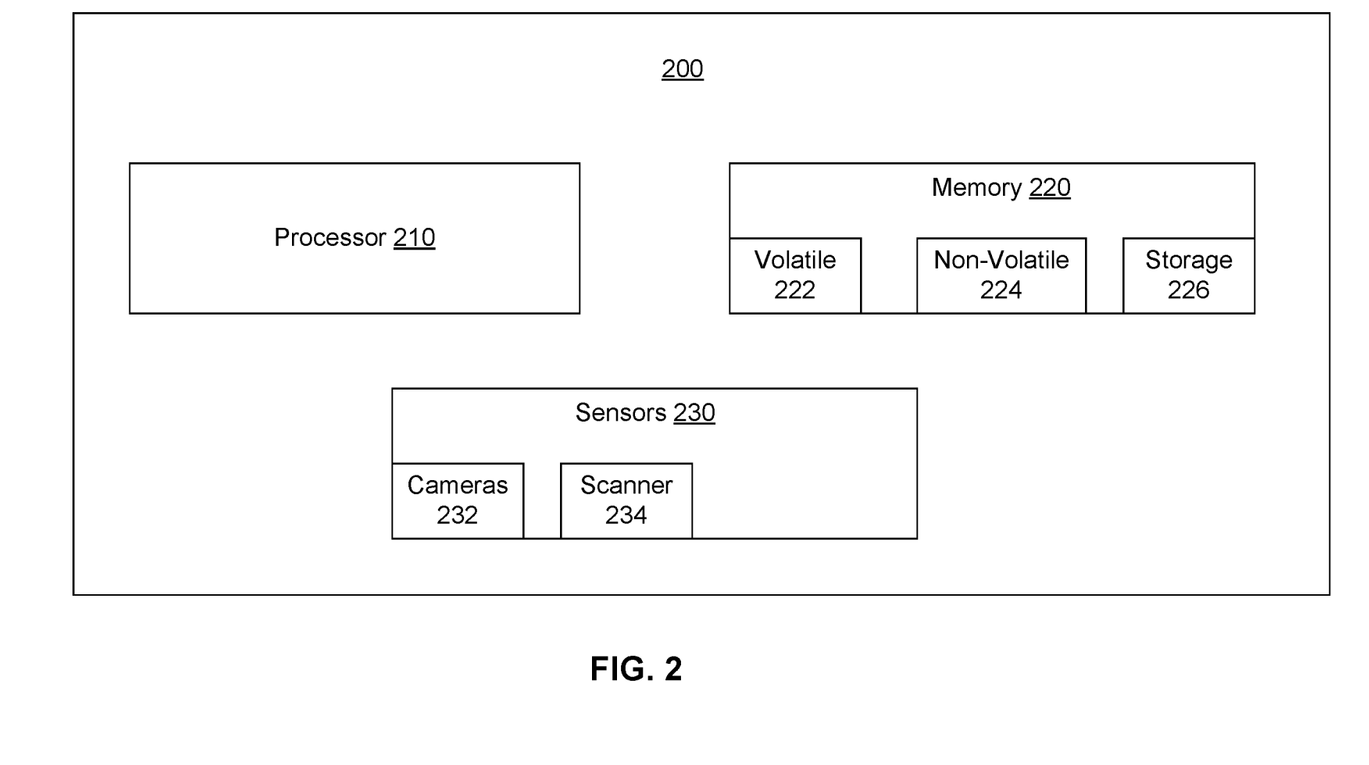
FIG. 2 is a high-level block diagram of stereo triangulation in an automotive platform, in accordance with an embodiment of the disclosure.

FIG. 2 is a high-level block diagram of stereo triangulation in an automotive platform, in accordance with an embodiment of the disclosure. Referring to FIG. 2, there is shown a platform 200 that may be similar to the platform 100 or the automotive platform 150. The platform 200 comprises a processor 210, a memory 220, and sensors 230. The processor 210 may be one or more of any type of processor that is able to execute instructions. The memory 220 may comprise volatile memory 222, non-volatile memory 224, and/or mass storage 226. The mass storage 226 may comprise, for example, magnetic hard drives, optical media, FLASH memory, etc. Data and executable instructions may be stored in the memory 220. The sensors 230 may comprise cameras 232 and scanner 234, as well as other sensors that may be used by the platform 200. For example, if the platform 200 is an automotive platform, other sensors may include radar, lidar, sonar, etc.

The processor 210 may be independent of the sensors 230, or a processor that is integrated with other parts. For example, the processor 210 may be integrated with a vision module that logically comprises the cameras 232 and the scanner 234, or is a processor that is logically a part of the sensors 230 and, accordingly, may control the sensors 230 and process data to/from the sensors 230. The processor 210 may be an independent processor that works in conjunction with one or more processors, including a processor(s) that may be part of the sensors 230, or to independently process data from the sensors 230 and/or control the various sensors 230.

The processor 210 may control the cameras 232 and the scanner 234 as described above to operate together, for example, to form 3-D images or compensate for loss of one or more of other sensors. The processor 210 may also control the cameras 232 and the scanner 234 for imaging at different distances, resolution, different image areas covered, and/or close-ups. While the processor 210 may be a single processor that also processes the information received from the cameras 232, various embodiments of the disclosure may have multiple processors 210 where one or more processors 210 may process the information from the cameras 232.

Figure 3:
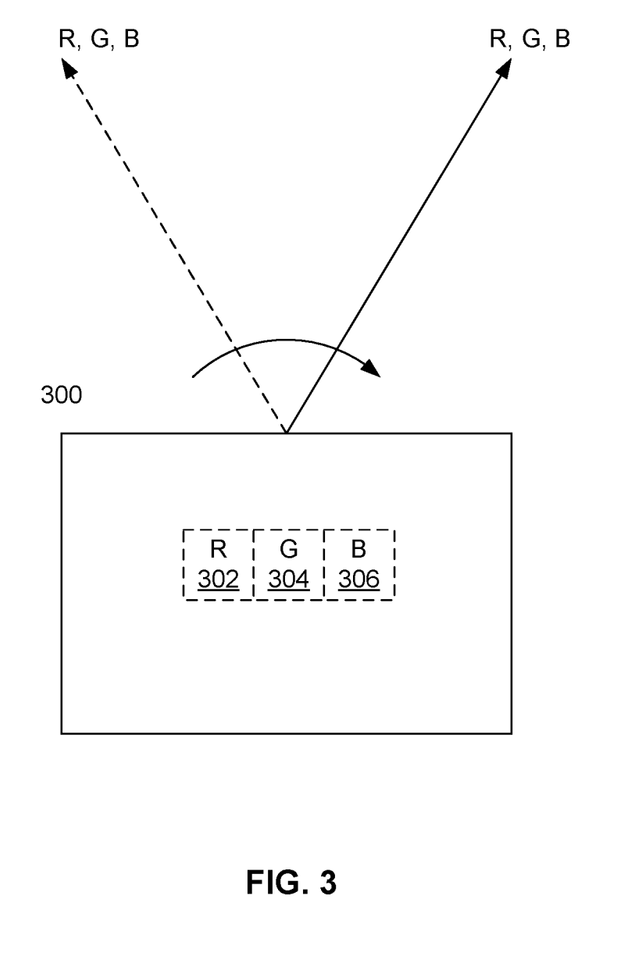
FIG. 3 is an illustration of an RGB scanner for use in stereo triangulation, in accordance with an embodiment of the disclosure.

FIG. 3 is an illustration of an RGB scanner for use in stereo triangulation, in accordance with an embodiment of the disclosure. Referring to FIG. 3, there is shown a scanner 300 that is configured to output three different illuminating lights of red, green, and blue (RGB). While RGB is commonly used, and hence, cost-effective, other colors may also be used in different embodiments. By using the scanner 300 that outputs RGB lights, the receiving cameras such as, for example, cameras 110 and 112, are able to produce full color images for display, for example, to a driver and/or passengers in the automotive platform 150.

Using two cameras 110 and 112 also generally provides for more accuracy and possibly truer color than with a single camera because data from the two cameras are relatively close to each other. For example, with a single camera the light sequence projected is compared to the light sequence received on the single camera. The received light sequence intensity is a function of distance and of the reflectivity of the object. Therefore the received light intensities can be very different than the projected light intensities, resulting in a not so robust comparison. However in the case of two cameras, sequences of similar intensities are compared, which is more robust. Furthermore, determination of depth, details, and/or color accuracy/intensity may be adversely affected by some light received by one camera due to occlusion or other effects, but light to the second camera may not be affected much, if at all, or in the same way. Accordingly, the separate sets of data may be processed and correlated to form a more accurate image than if just one camera was used.

The present disclosure does not set a limit on the number of cameras than can be used with a single scanner, on the ratio of cameras to scanners, nor on the number of scanner/camera(s) configurations that can be used on a given platform. The scanner/camera(s) configurations may be used independently or for processing a similar object(s) or area of the environment. For example, one or more scanner(s)/camera(s) configurations can be used to generate 360-degree (or less) 3-D output. In some cases, the output can be 2-D.

While the scanner 300 and the cameras 110 and 112 were described as using three colors, various embodiments may use more than three colors, and the colors used may include a number of different colors, including red, green, and/or blue, or none of red, green, and blue.

Figure 4A:
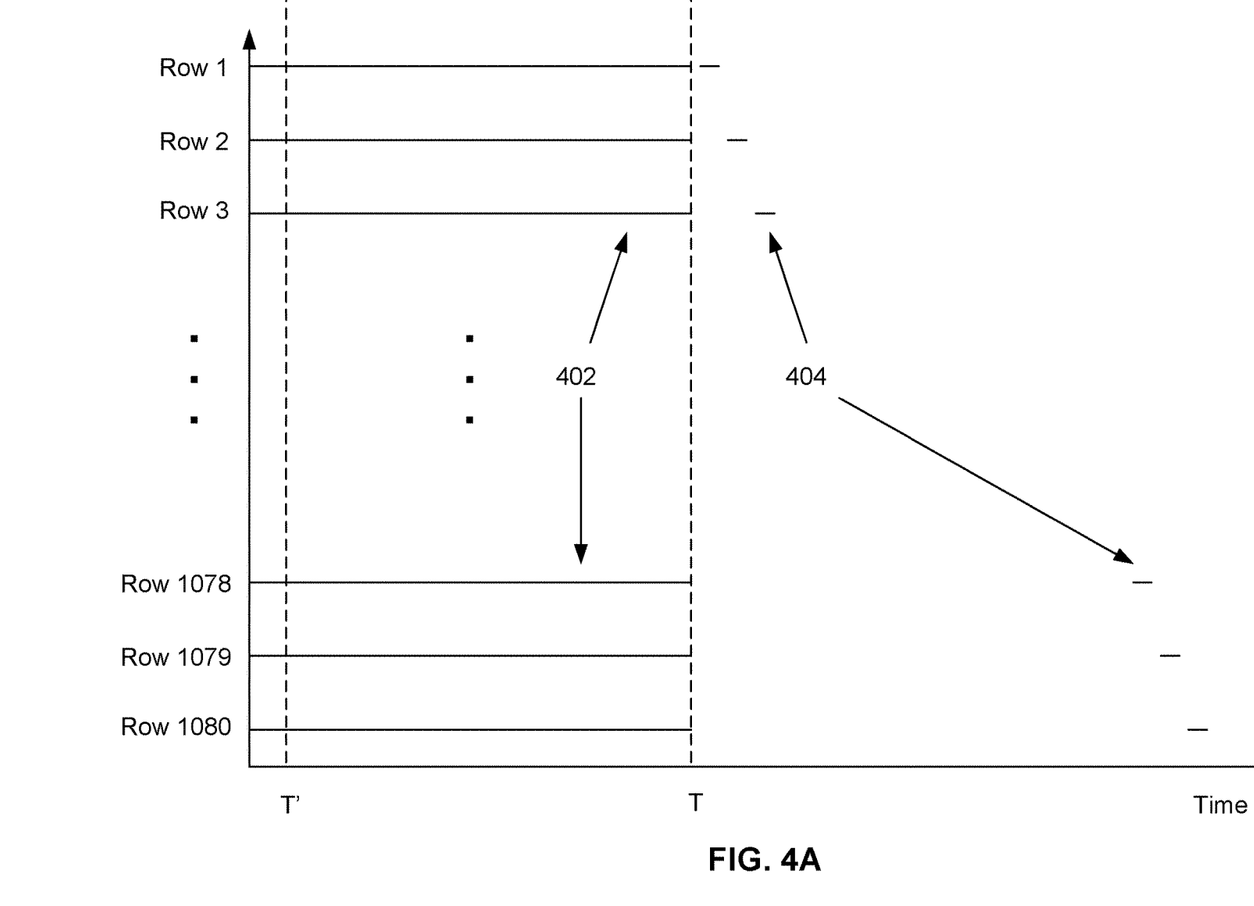
FIG. 4A is a graph of processing schedule for a global exposure camera.

FIG. 4A is a graph of processing schedule for a global exposure camera. Referring to FIG. 4A, there is shown a graph of pixel rows in the vertical axis and time to capture and process the pixel rows in the horizontal axis. As can be seen, an entire frame of image data 402 is captured before any processing of the data is performed. Since all pixels receive light for the same amount of time T, there may be more incoming light exposure than if a single row of pixels received the incoming light for a shorter period of time T'. Additionally, the processing of the received pixels cannot start until the period of time T has elapsed, leading to longer latency due to the delayed readout 404 of the pixels. If the exposure time is limited to 1 mS per frame, there is ambient light reduction by a factor of 20 at 50 Hz frame rate.

Figure 4B:
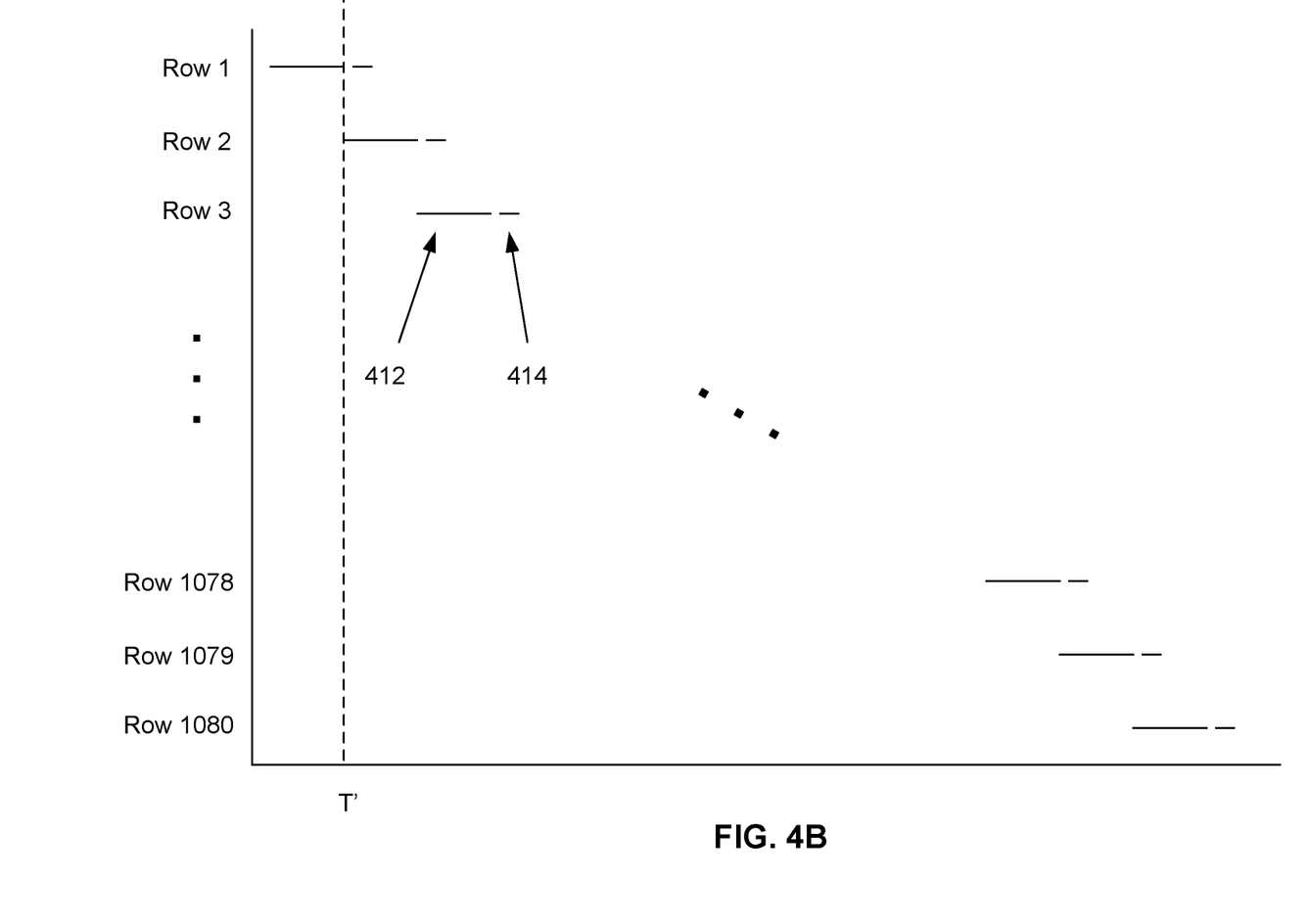
FIG. 4B is a graph of processing schedule for a rolling shutter camera, in accordance with an embodiment of the disclosure.

FIG. 4B is a graph of processing schedule for a rolling shutter camera, in accordance with an embodiment of the disclosure. Referring to FIG. 4B, there is shown a graph of pixel rows in the vertical axis and time to capture and process the pixel rows in the horizontal axis. Using a rolling shutter camera process, only one line of image data 412 is captured at a time. Since the amount of time T' to capture image data for a single line 412 is shorter than the time required to capture image data for an entire frame 402, the image data for the exposed line can be read out earlier 414 than reading out image data for the full-frame exposure 404 as shown in FIG. 4A. Since the next line can be exposed while the image data is being read out and processed, the rolling shutter camera process can result in faster processing of image data. Additionally, if the exposure time is limited to 20 uS per line, the ambient light is reduced by a factor of 1000 at 50 Hz frame rate, leading to a much less noisy image capture. This results in ambient light reduction by a factor of 50 over the global exposure camera described in FIG. 4A.

This allows higher frame rates and good low-light performance by, for example, the cameras 110 and 112. Furthermore, by aligning and synchronizing the scanning light from, for example, the scanner 120 with rolling shutter method for the cameras 110 and 112, there is much less data to correlate for image processing, including for 3-D imaging. The rows are read out row by row and the 3-D data can be generated using triangulation for a row at a time or a limited number of rows at a time. This simplifies processing of the data from the cameras 110 and 112 by only having to deal with a smaller number of pixels where the pixels processed are for one row at a time when, for example, one row of pixels are exposed at a time.

Rolling shutter camera process may use, for example, color coding by the scanner 120 to facilitate pixel processing.

Furthermore, by using, for example, the scanner 120 that may output RGB laser lights and cameras 110 and 112 that are capable of detecting RGB lights, no sensor fusion of 2-D sensors and 3-D sensors is required, again simplifying a complex process and a potential source of data conflict.

While the above description refers to the rolling shutter camera process for a row of pixels being processed at a time, various embodiments of the disclosure need not be so limited. For example, a smaller number of pixels may be exposed at a time. The number of pixels exposed may be as few as, for example, one pixel at a time. Accordingly, it can be seen that the ambient light input to a pixel can be reduced even more when processing the image pixel by pixel. There may be various methods to control the pixels exposed to light, including, for example, controlling each pixel or group of pixels to receive light at an appropriate time. The scanner 120, 234, 300 may also be controlled as to a tightness of the light beam (or photons) that is emitted to an object. For example, the tighter the light beam, the smaller the area of the object that reflects the light beam. The number of pixels exposed at a given time may depend on various parameters such as, for example, the ambient light, sensitivity of the individual light detectors (pixels), processor(s) used for processing the pixel information, light output by a scanner, etc.

However, if correlating information from the reduced number of pixels for the two cameras gets more difficult, the number of pixels may be increased periodically or as needed to synchronize the information received from the different cameras.

When the pixels are processed one at a time, they may be thought of as being voxels where the time coding may give each voxel its third dimension of depth. Since there may not be encoding or decoding involved due to the time coding for each voxel, the processing may be simplified. Accordingly, the latency due to processing may be alleviated.

Figure 5:
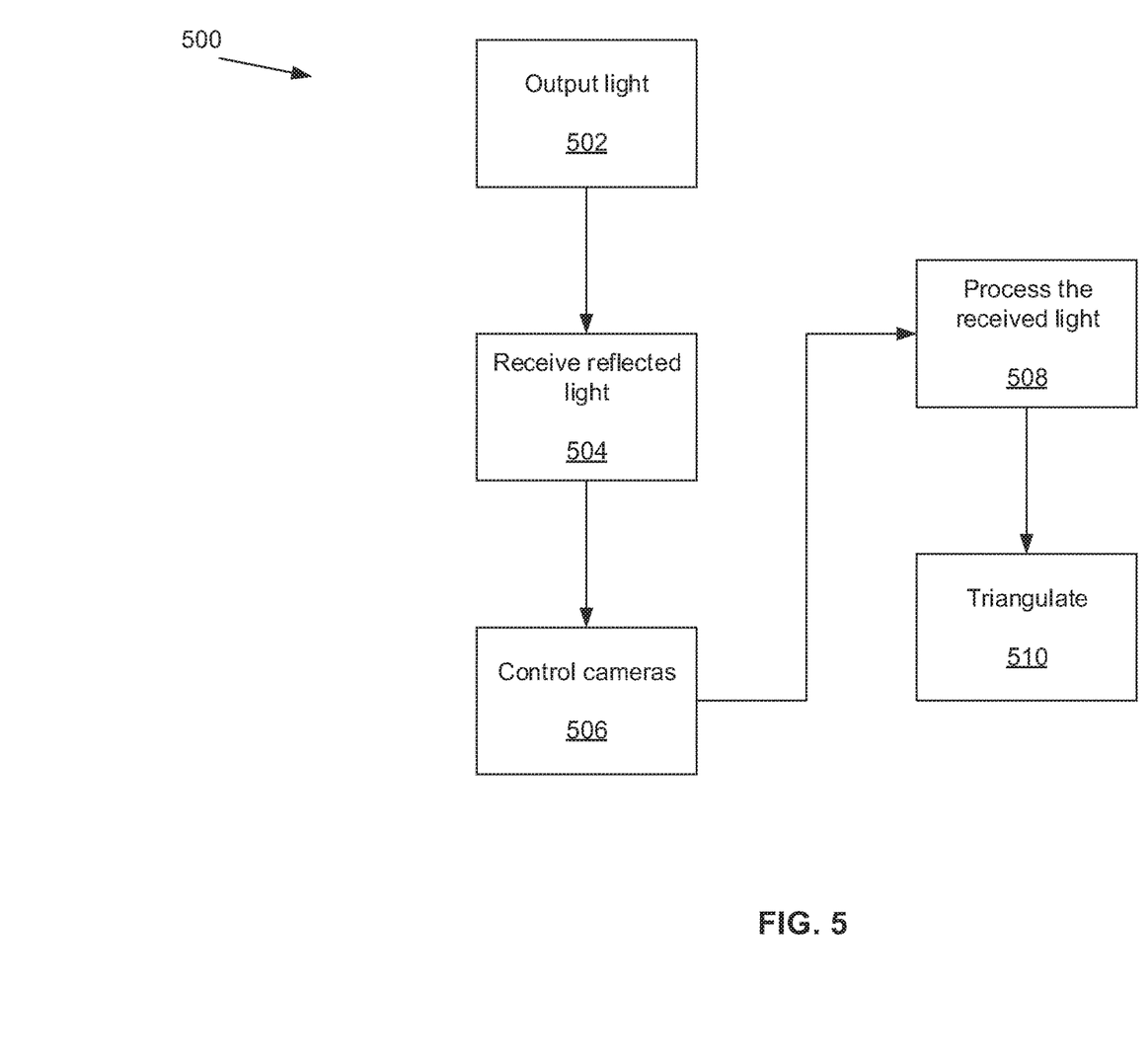
FIG. 5 is an example flow diagram for detecting an object, in accordance with an embodiment of the disclosure.

FIG. 5 is an example flow diagram for detecting an object, in accordance with an embodiment of the disclosure. Referring to FIG. 5, there is shown an example flow diagram 500 comprising blocks 502 to 510. In block 502, at least one processor, such as, for example, the processor 210, may control the collimated scanning light source, such as, for example, the scanner 120, as well as the first camera 110 and the second camera 112. The scanner 120 may output source light that may be substantially collimated. The first camera 110, the second camera 112, and the scanner 120 may be, for example, on an epipolar plane. The scanner 120 may have a sweep range that may be varied horizontally and/or vertically, and the intensity of the scanner 120 may also be varied.

In block 504, the first camera 110 may receive first reflected light that is the source light reflected from the object 130 to the first camera 110, and the second camera 112 may receive second reflected light that is the source light reflected from the object 130 to the second camera 112. The second camera 112 is separated in space from the first camera 110. The first camera 110 and/or the second camera 112 may receive the first reflected light and the second reflected light, respectively, by a rolling shutter camera process.

In block 506, at least one processor 210 may control the scanner 120 to output the light as described, for example, in FIGS. 1-4, and the first camera 110 and the second camera 112 to receive the reflected light as described, for example, in FIGS. 1-4. In block 508, the processor 210 may process one or both of the first reflected light and the second reflected light to detect the object 130. For example, at least one processor 210 may process a row of pixels at a time or a portion of a row of pixels at a time, where the portion of a row may include a single pixel at a time from the first camera 110 and/or the second camera 112. In block 510, the object 130 may be triangulated by using a triangle with vertices of the object 130, the first camera 110, and the second camera 112.

The various functions described in the flow diagram 500 may be described in more detail in the descriptions for the FIGS. 1-4B.

Therefore, it can be seen that one embodiment of the present disclosure relates to method and system for stereo triangulation, which may also be used for 3D mapping of the environment, that comprises rolling exposure RGB cameras, with RGB row data being read from each row after the exposure time for that row is finished while the next row is being exposed to light, and processing the RGB row data after reading the RGB row data. As noted above, the number of pixels exposed at a given time may be smaller than a row. Accordingly, it can be seen that rolling exposure (or rolling shutter) process provides a significant advantage for the number of cameras used, whether one or two or more cameras.

The use of a scanner greatly reduces the amount of processing overhead for images received by the cameras, and the use of rolling exposure method allows extremely low latency due to being able to read out triangulation data on a line by line. When the pixels are read out one at a time (or a few pixels at a time) with each pixel being time coded as voxels, the processing latency may be reduced significantly or eliminated. Accordingly, 3-D images can be generated with a fraction of the processing needed if a scanner and/or rolling exposure was not used.

While various embodiments have been described for functional uses of the present disclosure, it should be understood that the uses are not limited to just the examples disclosed. Additionally, while the rolling exposure cameras were described as exposing a single row at a time, various embodiments may expose more than one row at a time. For example, two or more rows may be exposed at a time, or a subset of pixels in a line may be exposed at a time where the subset may consist of only one pixel or more than one pixel, depending on various designs and/or environmental conditions.

Additionally, while the disclosure so far has described a scanner(s) used with one or more cameras, other embodiments may use the scanner(s)/camera(s) system with, for example, other devices such as radar, lidar, sonar, etc. Accordingly, various embodiments may have each of one or more transmitters project a signal, which may be structured sequences or not, one or more receivers receive the signal, and one or more processors process the received signals. In some cases, the transmitter and the receiver may be separate devices. In other cases the transmitter and the receiver may be part of the same device, such as, for example, a radar antenna transmitting a signal and receiving a reflection of that signal.

These various embodiments may be used by any platform to take notice of their surrounding environment. Accordingly, any vehicle, whether under full control of a local or remote driver/operator, semi-autonomous, or fully autonomous, may make use any of the various embodiments described herein. The vehicle may be, for example, an automobile, boat, airplane, spacecraft, air, land, and/or water based drone, robot, etc., and include a robot vacuum cleaner, robot lawn mower, etc.

Furthermore, any stationary platform may also make use of the various embodiments. For example, a light house may make use of one or more of the various embodiments to keep track of and control traffic (possibly air traffic, land traffic, and/or water traffic) as well as provide a beacon (light, electronic, sound, etc.) to warn watercraft or other types of vehicles of danger. Additionally, air traffic control systems and/or a traffic control systems may also use various embodiments of the disclosure.

In addition, various embodiments of the present disclosure may also be used for other purposes. For example, embodiments may be used for games that detect surrounding objects (game player(s) to be inserted as part of the game display, etc.), or by individuals that wear a device that incorporates various embodiments of the disclosure. An example of a user worn device may be, for example, augmented reality headsets, virtual reality headsets, etc. Various embodiments of the disclosure may also be used to guide visually impaired people. For that matter, non-visually impaired people may also wear a device that incorporates an embodiment of the disclosure to warn them of obstructions, danger, etc. if they are not paying attention to their environment while they are mobile (walking/jogging/running, bicycling, roller blading, riding a Segway, etc.) or stationary. Accordingly, it can be seen that various embodiments of the disclosure can be used for all types of vehicle, for user worn devices (headsets, goggles, etc.) and for various devices that need to detect objects and/or map an area. The disclosure does not restrict the various embodiments to any specific use.

Therefore, it can be seen that various embodiments of the disclosure can be used in many applications to sense the surrounding area, analyze the sensed signals, and generate responses as needed. The response may be, for example, taking evasive maneuvers, notifying other platforms/devices/people of what was sensed/analyzed/responded to, as well as receiving from others similar information. Thus, the effective area covered for the sense/analyze/respond scheme can be greatly increased over what can be accomplished by a single platform by sharing information with at least one other platform. The various information can be shared directly or via third party platforms or the Internet/cloud. Accordingly, various objects (mobile and stationary), condition of the roads, traffic on the roads, in the air, and/or the water may be kept track of over time, and correct responses may be made as needed.

An embodiment of the disclosure may be a system for detecting an object, comprising a substantially collimated scanning light source configured to output source light. A first camera may be configured to receive first reflected light, where the first reflected light is the source light reflected from the object to the first camera. A second camera may be configured to receive second reflected light, where the second reflected light is the source light reflected from the object to the second camera, and the second camera is separated in space from the first camera. One or more processors may be configured to control the collimated scanning light source, the first camera, and the second camera, and process the first reflected light and the second reflected light to detect the object. The first camera, the second camera, and the collimated scanning light source may be configured to be on an epipolar plane.

The collimated scanning light source may be configured to vary its horizontal sweep range and/or vertical sweep range. The first camera and/or the second camera may be able to swivel horizontally and/or vertically. The collimated scanning light source may be configured to vary an intensity of the source light. The collimated scanning light source may output the source light as raster output.

Another embodiment of the disclosure may be a method for detecting an object, comprising outputting source light by a substantially collimated scanning light source, receiving first reflected light by a first camera, wherein the first reflected light is the source light reflected from the object to the first camera, and receiving second reflected light by a second camera, wherein the second reflected light is the source light reflected from the object to the second camera, and the second camera is separated in space from the first camera. At least one processor may control the collimated scanning light source, the first camera, and the second camera, and process one or both of the first reflected light and the second reflected light to detect the object. The first camera, the second camera, and the collimated scanning light source are on an epipolar plane. The collimated scanning light source sweep range may be varied horizontally and/or vertically, and an intensity of the source light of the collimated scanning light source may also be varied.

The first camera and the second camera may receive the first reflected light and the second reflected light, respectively, by a rolling shutter camera process. At least one processor may process a row of pixels at a time or a portion of a row of pixels (including a single pixel) at a time from the first camera and/or the second camera. When the pixels are processed a single pixel at a time, each pixel may be time coded. The object may be triangulated by using a triangle with vertices of the object, the first camera, and the second camera.

Another embodiment of the disclosure may be a system for detecting an object, comprising a substantially collimated scanning light source configured to output source light, where the source light comprises three discrete lights of red, green, and blue. A first camera may be configured to receive first reflected light with a rolling shutter camera process, where the first reflected light is the source light reflected from the object to the first camera. A second camera configured to receive second reflected light with the rolling shutter camera process, where the second reflected light is the source light reflected from the object to the second camera, and the second camera is separated in space from the first camera. At least one processor may be configured to control the collimated scanning light source, the first camera, and the second camera, and process the first reflected light and the second reflected light to detect the object.

The first camera, the second camera, and the collimated scanning light source may be on an epipolar plane. The first camera and/or the second camera may receive the first reflected light and the second reflected light, respectively, by a rolling shutter camera process. At least one processor may be configured to process a row of pixels or a portion of a row of pixels (including one pixel) at a time from a respective one or both of the first camera and the second camera. When processing one pixel at a time, each pixel may be time coded. At least one processor may triangulate the object by using the object, the first camera, and the second camera as vertices of a triangle.

The first camera and/or the second camera may be configured to receive the first reflected light and the second reflected light, respectively, by a rolling shutter camera process. At least one processor may be configured to process a row of pixels at a time or a portion of a row of pixels (including a single pixel) at a time from the first camera and/or the second camera. When the processing is for a single pixel at a time, each pixel may be time coded.

The object may be triangulated by using a triangle with vertices of the object, the first camera, and the second camera.

Various parts of the various embodiments of the disclosure may be written as computer programs and may be implemented processors that execute the programs using a non-transitory computer-readable recording medium.

Non-transitory computer-readable recording medium may include, for example, magnetic storage media (e.g., ROM, floppy disks, hard disks, etc.), optical recording media (e.g., CD-ROMs, or DVDs), FLASH drives, etc.

While various embodiments of the disclosure have been described with reference to the figures, it will be understood by those of ordinary skill in the art that various changes in form and details may be made therein without departing from the spirit and scope of the disclosure as defined by the following claims. Accordingly, the above embodiments and all aspects thereof are examples only and are not limiting.

What is claimed is:

1. A system for detecting an object, comprising:
   a substantially collimated scanning light source configured to output source light;
   a first camera configured to receive first reflected light, wherein the first reflected light is the source light reflected from the object to the first camera, the first reflected light having a first intensity that is a function of distance to and reflectivity of the object relative to the first camera;
   a second camera configured to receive second reflected light, wherein the second reflected light is the source light reflected from the object to the second camera, and the second camera is separated in space from the first camera, the second reflected light having a second intensity that is a function of distance to and reflectivity of the object relative to the second camera; and
   one or more processors configured to:
      control the scanning light source, the first camera, and the second camera; and
      concurrently process both the first reflected light and the second reflected light at least in part by comparing the first and second intensities to detect the object and to determine one or more of: distance to the object, a color intensity of the object, and a color accuracy of the object.

2. The system of claim 1, wherein the first camera, the second camera, and the scanning light source are on an epipolar plane.

3. The system of claim 1, wherein the scanning light source is configured to vary its sweep range one or both of horizontally and vertically.

4. The system of claim 1, wherein one or both of the first camera and the second camera is able to swivel one or both of horizontally and vertically.

5. The system of claim 1, wherein the scanning light source is configured to vary an intensity of the source light.

6. The system of claim 1, wherein one or both of the first camera and the second camera are configured to receive the first reflected light and the second reflected light, respectively, by a rolling shutter camera process.

7. The system of claim 6, wherein at least one of the one or more processors is configured to process a row of pixels at a time.

8. The system of claim 6, wherein at least one of the one or more processors is configured to process a portion of a row of pixels at a time.

9. The system of claim 6, wherein at least one of the one or more processors is configured to process pixels, generated from one or both of the first reflected light and the second reflected light, one pixel at a time.

10. The system of claim 9, wherein each of the pixels generated from one or both of the first reflected light and the second reflected light is time coded.

11. The system of claim 1, wherein the processor is configured to perform triangulation of the object by using the object, the first camera, and the second camera as vertices of a triangle.

12. The system of claim 1, wherein the scanning light source is configured to output the source light as a raster output.

13. A method for detecting an object, comprising:
outputting source light by a substantially collimated scanning light source;
receiving first reflected light by a first camera, wherein the first reflected light is the source light reflected from the object to the first camera, the first reflected light having a first intensity that is a function of distance to and reflectivity of the object relative to the first camera;
receiving second reflected light by a second camera, wherein the second reflected light is the source light reflected from the object to the second camera, and the second camera is separated in space from the first camera, the second reflected light having a second intensity that is a function of distance to and reflectivity of the object relative to the second camera;
controlling, by one or more processors, the scanning light source, the first camera, and the second camera; and
concurrently processing both of the first reflected light and the second reflected light at least in part by comparing the first and second intensities to detect the object and to determine one or more of: distance to the object, a color intensity of the object, and a color accuracy of the object.

14. The method of claim 13, wherein the first camera, the second camera, and the scanning light source are on an epipolar plane.

15. The method of claim 13, comprising varying a sweep range of the scanning light source one or both of horizontally and vertically.

16. The method of claim 13, comprising varying an intensity of the source light of the scanning light source.

17. The method of claim 13, wherein one or both of the first camera and the second camera receive the first reflected light and the second reflected light, respectively, by a rolling shutter camera process.

18. The method of claim 17, comprising processing, by at least one of the one or more processors, a row of pixels at a time from a respective one or both of the first camera and the second camera.

19. The method of claim 17, comprising processing, by at least one of the one or more processors, a portion of a row of pixels at a time from a respective one or both of the first camera and the second camera.

20. The method of claim 19, comprising, when the portion of a row of pixels is a single pixel, time coding the single pixel.

21. The method of claim 13, comprising triangulation of the object by using the object, the first camera, and the second camera as vertices of a triangle.

22. A system for detecting an object, comprising:
a scanning light source configured to output a source light, wherein the scanning light source comprises at least two discrete lights that are substantially collimated;
a first camera configured to receive first reflected light with a rolling shutter camera process, wherein the first reflected light is the source light reflected from the object to the first camera;
a second camera configured to receive second reflected light with the rolling shutter camera process, wherein the second reflected light is the source light reflected from the object to the second camera, and the second camera is separated in space from the first camera; and
one or more processors configured to:
control the scanning light source, the first camera, and the second camera; and
process both the first reflected light and the second reflected light a row of pixels at a time to detect the object and to determine one or more of: depth to the object, a color intensity of the object, and a color accuracy of the object.

23. The system of claim 22, wherein the at least one of the one or more processors is configured to triangulate the object by using as vertices of a triangle the object and two of: the scanning light source, the first camera, and the second camera.

* * * * *